US011368027B2

(12) United States Patent
Kwak et al.

(10) Patent No.: US 11,368,027 B2
(45) Date of Patent: Jun. 21, 2022

(54) ELECTRONIC DEVICE INCLUDING CONTROL CIRCUITS CONTROLLING SWITCHES CONNECTED TO CHARGING CIRCUIT

(71) Applicant: Samsung Electronics Co., Ltd., Gyeonggi-do (KR)

(72) Inventors: Myunghoon Kwak, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 16/426,125

(22) Filed: May 30, 2019

(65) Prior Publication Data

US 2019/0372376 A1 Dec. 5, 2019

(30) Foreign Application Priority Data

May 31, 2018 (KR) .......................... 10-2018-0062712

(51) Int. Cl.
*H02J 7/00* (2006.01)
*H01R 31/06* (2006.01)
(52) U.S. Cl.
CPC .............. *H02J 7/00* (2013.01); *H01R 31/065* (2013.01)
(58) Field of Classification Search
CPC .... H02J 7/0052; H02J 7/00; H02J 2007/0062; H01R 31/06; H01R 31/065
USPC ....................................................... 320/103
See application file for complete search history.

(56) References Cited

U.S. PATENT DOCUMENTS

| 9,459,659 | B2 | 10/2016 | Chang | |
|---|---|---|---|---|
| 9,652,351 | B2 | 5/2017 | Srivastava et al. | |
| 2005/0246557 | A1 | 11/2005 | Vanzante | |
| 2006/0103355 | A1 | 5/2006 | Patino et al. | |
| 2008/0007213 | A1* | 1/2008 | Huang | H02J 7/045 320/107 |
| 2008/0297112 | A1 | 12/2008 | Cordes et al. | |

(Continued)

OTHER PUBLICATIONS

International Search Report dated Sep. 9, 2019.
European Search Report dated Jan. 20, 2021.

*Primary Examiner* — Richard Isla
*Assistant Examiner* — Dung V Bui
(74) *Attorney, Agent, or Firm* — Cha & Reiter, LLC

(57) ABSTRACT

In one embodiment, an electronic device may include a battery, a charging circuit electrically connected to the battery, a first connector, a second connector, a first switch configured to electrically connect the first connector to the charging circuit or to open an electrical connection between the first connector and the charging circuit, a second switch configured to electrically connect the second connector to the charging circuit or to open an electrical connection between the second connector and the charging circuit, a first control circuit configured to control the first switch to electrically connect the first connector to the charging circuit and to control the second switch to open the electrical connection between the second connector and the charging circuit based on first power supplied by a first external electronic device through the first connector, and a second control circuit configured to at least partially control the second switch to electrically connect the second connector to the charging circuit based at least in part on second power supplied by a second external electronic device through the second connector.

19 Claims, 8 Drawing Sheets

(56) References Cited

U.S. PATENT DOCUMENTS

| | | | |
|---|---|---|---|
| 2009/0127935 A1 | 5/2009 | Hung et al. | |
| 2009/0278506 A1* | 11/2009 | Winger | H02J 7/0068 |
| | | | 320/160 |
| 2011/0156659 A1 | 6/2011 | Saeki et al. | |
| 2012/0242282 A1* | 9/2012 | Wada | G06F 1/266 |
| | | | 320/107 |
| 2013/0038990 A1 | 2/2013 | Chen | |
| 2014/0266011 A1* | 9/2014 | Mehta | H02M 3/1582 |
| | | | 320/107 |
| 2015/0084504 A1 | 3/2015 | Rokenbrodt et al. | |
| 2016/0156137 A1 | 6/2016 | Pan et al. | |
| 2016/0380455 A1* | 12/2016 | Greening | H02M 1/10 |
| | | | 320/114 |
| 2017/0025879 A1* | 1/2017 | Thompson | G06F 1/266 |
| 2017/0126041 A1* | 5/2017 | Sato | G06F 1/26 |
| 2017/0185096 A1* | 6/2017 | Rueger | G05F 3/262 |
| 2017/0279284 A1 | 9/2017 | Lim et al. | |
| 2018/0019673 A1* | 1/2018 | Cai | H02M 1/088 |

* cited by examiner

ELECTRONIC DEVICE INCLUDING CONTROL CIRCUITS CONTROLLING SWITCHES CONNECTED TO CHARGING CIRCUIT

CROSS-REFERENCE TO RELATED APPLICATION(S)

This application is based on and claims priority under 35 U.S.C. § 119 to Korean Patent Application No. 10-2018-0062712, filed on May 31, 2018, in the Korean Intellectual Property Office, the disclosure of which is incorporated by reference herein in its entirety.

TECHNICAL FIELD

The disclosure relates to an electronic device configured to manage the charging of a battery in substitute for a processor.

BACKGROUND

An electronic device (e.g., a tablet PC) is electrically connected to an external electronic device through a connector, and may transmit and receive power and data to and from the external electronic device. The electronic device may identify the state (e.g., voltage) of power obtained from the external electronic device and/or information (e.g., type or vendor) related to the external electronic device, and may deliver power to a charging circuit based on a result of the identification, so battery charging is performed or an electrical connection between the connector and the charging circuit is open (in other words, blocked) to prevent the power from being delivered to the battery.

SUMMARY

According to an embodiment of the disclosure, an electronic device may include a battery, a charging circuit electrically connected to the battery, a first connector, a second connector, a first switch configured to electrically connect the first connector to the charging circuit or to open an electrical connection between the first connector and the charging circuit, a second switch configured to electrically connect the second connector to the charging circuit or to open an electrical connection between the second connector and the charging circuit, a first control circuit configured to control the first switch to electrically connect the first connector to the charging circuit and to control the second switch to open the electrical connection between the second connector and the charging circuit based on first power supplied by a first external electronic device through the first connector, and a second control circuit configured to at least partially control the second switch to electrically connect the second connector to the charging circuit based at least in part on second power supplied by a second external electronic device through the second connector. According to an embodiment of the disclosure, an electronic device may include a battery, a charging circuit electrically connected to the battery, a first connector, a second connector, a first switch configured to electrically connect the first connector to the charging circuit or to open an electrical connection between the first connector and the charging circuit, a second switch configured to electrically connect the second connector to the charging circuit or to open an electrical connection between the second connector and the charging circuit, a processor electrically connected to the first switch and the second switch and configured to control the first switch and the second switch, a first control circuit configured to control the first switch to electrically connect the first connector to the charging circuit based on first power supplied by a first external electronic device through the first connector in substitute for the processor when the processor is an inactive state, and a second control circuit configured to at least partially control the second switch to electrically connect the second connector to the charging circuit based at least in part on second power supplied by a second external electronic device through the second connector in substitute for the processor when the processor is the inactive state.

According to an embodiment of the disclosure, an electronic device may include a battery, a charging circuit electrically connected to the battery, a first connector, a second connector, one or more switches, one or more control circuits, and a processor. When the processor is an active state, the processor may be configured to control the one or more switches to supply one of first power and second power to the charging circuit, when the first power is supplied by a first external electronic device connected through the first connector and the second power is supplied by a second external electronic device connected through the second connector simultaneously. When the processor is an inactive state, the one or more control circuits may be configured to control the one or more switches to supply at least one of the first power and the second power to the charging circuit, when the first power is supplied through the first connector and the second power is supplied through the second connector simultaneously.

DETAILED DESCRIPTION

In general, an external power source may be connected to an electronic device through a given connector of the electronic device. The electronic device may be charged with power supplied by the external power source. The charging of the electronic device may be generalized by the processor of the electronic device. If a plurality of external power sources is connected to an electronic device through a plurality of connectors, however, a processor may be in an inactive state in which it does not perform or cannot perform an operation of managing charging for various reasons, such as power source OFF. In such a case, it is not easy to handle the occurrence of an issue, such as that a plurality of pieces of power is input at the same time through the plurality of connectors, for example.

The disclosure may provide an electronic device configured to perform stable charging control.

Figure 1:
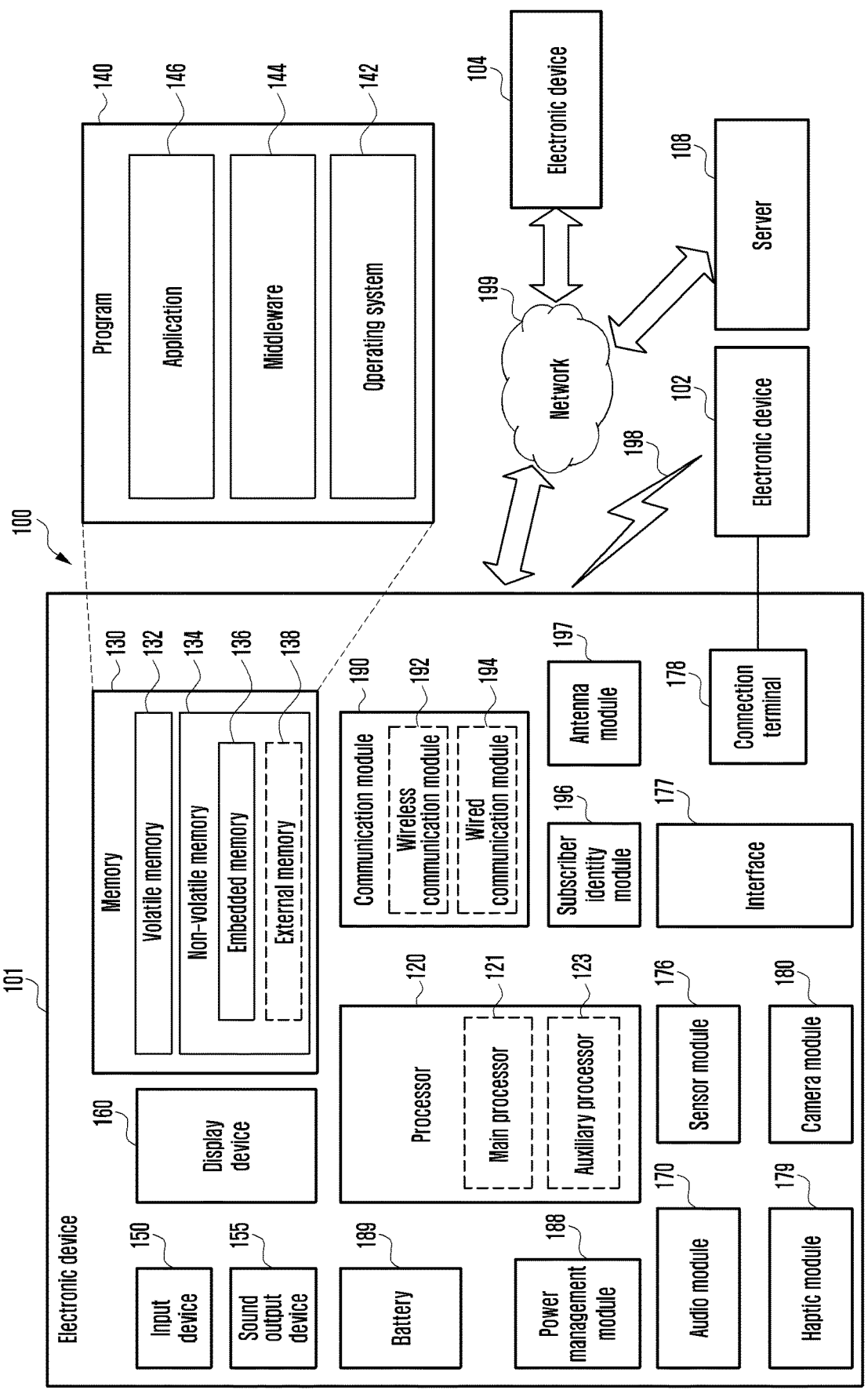
FIG. 1 shows an electronic device within a network environment in certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197.

The power management module 188 and the battery 189 will be described in more detail in FIG. 2.

In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as being embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., in a wired manner) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., in a wired manner) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
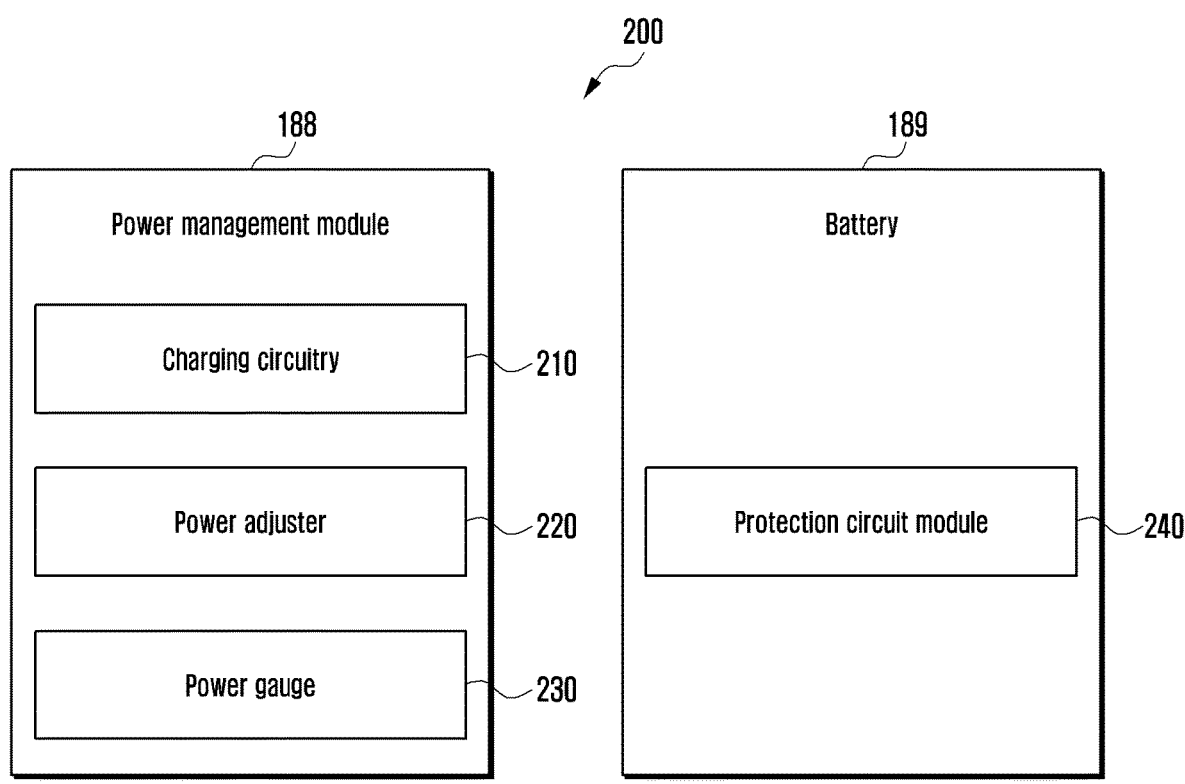
FIG. 2 is a block diagram of a power management module and a battery according to certain embodiments.

FIG. 2 is a block diagram 200 illustrating the power management module 188 and the battery 189 according to certain embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme or mode (e.g., normal charging or quick charging) based at least in part on a type of the external power source (e.g., a power outlet, a USB, or wireless charger), magnitude or amount of power that may be supplied from the external power source (e.g., about 20 Watt or more), or an attribute of the battery 189, and may charge the battery 189 using the selected charging scheme or mode. The external power source may be connected with the electronic device 101, for example, directly via the connecting terminal 178 or wirelessly via, for example, a coil antenna in the antenna module 197.

The power adjuster 220 may generate a power in a plurality of different formats (for example, according to a plurality of different standards) or amounts having different voltage levels and/or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to be abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., in a wired manner), wirelessly, or via a third element.

As used herein, the term "module" may include a unit implemented in hardware, or hardware programmed with instructions, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
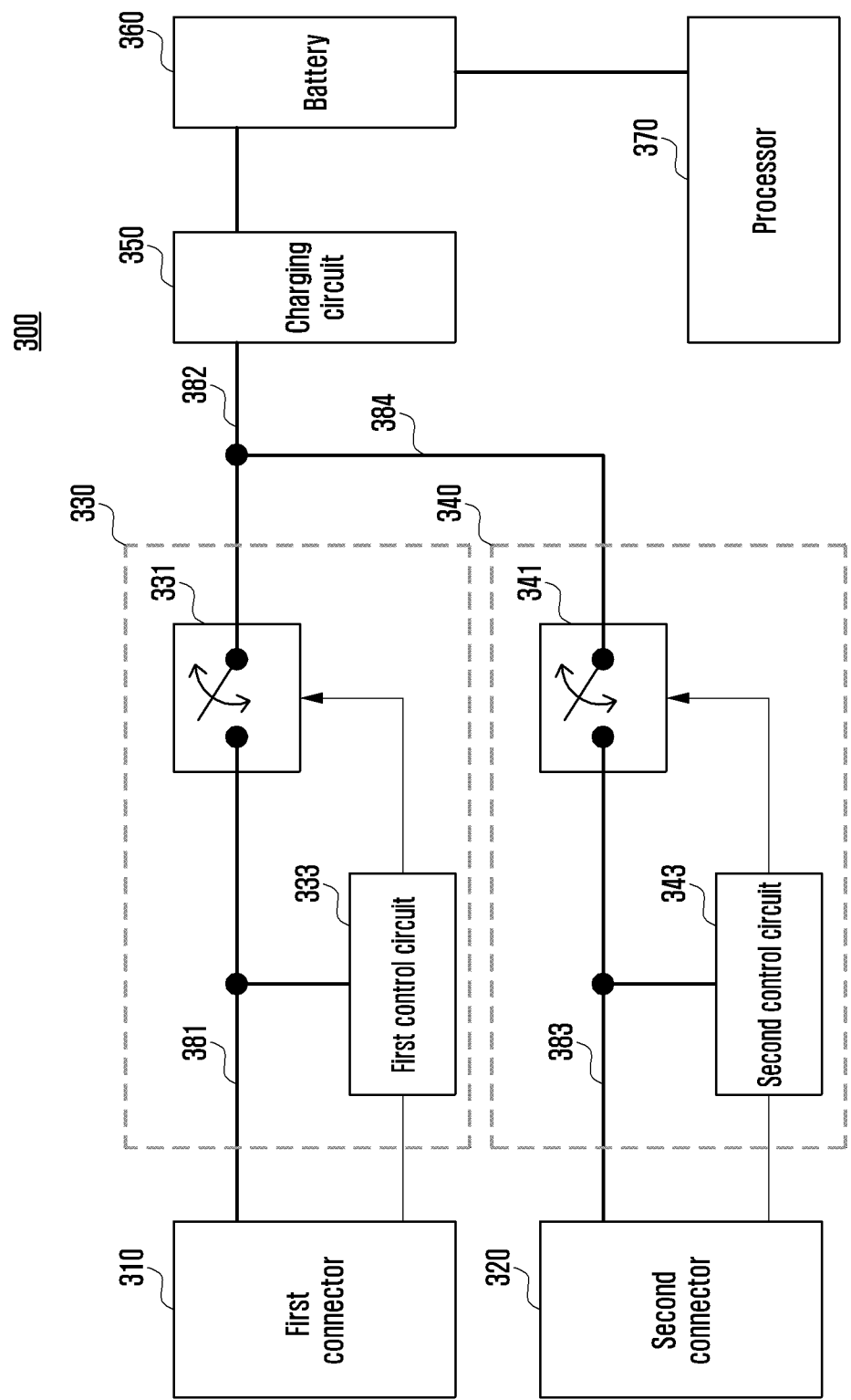
FIG. 3 shows an electronic device configured to manage the charging of a battery according to certain embodiments of the disclosure.

FIG. 3 shows an electronic device configured to manage the charging of a battery according to certain embodiments of the disclosure. Referring to FIG. 3, the electronic device 300 (e.g., the electronic device 101 of FIG. 1) may include a first connector 310, a second connector 320, a first switching block 330, a second switching block 340, a charging circuit 350, a battery 360 and a processor 370.

The first switching block 330 may include a first switch 331 and a first control circuit 333 configured to control an operation of the first switch. The second switching block 340 may include a second switch 341 and a second control circuit 343 configured to control an operation of the second switch.

In certain embodiments of the disclosure, the inactive state of the processor 370 may be the state in which the processor 370 cannot control (or determine) an operation of supplying the charging circuit 350 with power of an external power source connected to a connector. For example, the operation may be performed by the switching blocks 330 and 340. The processor 370 cannot control the switching blocks 330 and 340 in a power source OFF state in which there is no or reduced (such as the amount used during a sleep mode) power supply to the processor 370. Such a power source OFF state may be defined as the inactive state of the processor 370 where power is not supplied to the processor. Furthermore, if the processor 370 is a sleep state, this may be defined as the inactive state of the processor 370 although the state is a power ON state in which power is supplied to the processor 370. Furthermore, if the processor 370 is configured to perform only a given operation (e.g., low power mode) and thus cannot perform control an external power source, this state may be defined as the inactive state of the processor 370. Hereafter, an "inactive state" of the processor—may refer to the power source OFF state, or the power source ON state where the processor 370 is in reduced operation state which renders it unable to control the switching blocks 330 and 340.

According to certain embodiments of the disclosure, the first connector 310 is one element included in the connection terminal 178 of FIG. 1, for example, and may include one or more pins for power delivery (PD) communication (e.g., transmit power of the battery 360 to an external electronic device, receive power from an external electronic device, or receive information related to an external electronic device from the external electronic device) and one or more pins configured to transmit and receive data (e.g., multimedia data or voice data) to and from an external electronic device. According to one embodiment, the first connector 310 may include a plurality of pins that complies with a physical standard defined in USB type C. Various connectors may be divided into a socket (or receptacle, female) and a plug (male) depending on their forms. According to one embodiment, the first connector 310 may be a socket.

According to certain embodiments of the disclosure, the second connector 320 is one element included in the connection terminal 178 of FIG. 1, for example, and may be configured to perform PD and data communication substantially identically with the first connector 310.

According to certain embodiments of the disclosure, the first switch 331 may selectively connect the first connector 310 to the charging circuit 350. For example, the first electrode of the first switch 331 may be electrically connected to the power source pin (e.g., Vbus pin) of the first connector 310 through a first power source line 381. The second electrode of the first switch 331 may be electrically connected to the charging circuit 350 through a second power source line 382. The first electrode and the second electrode are electrically connected (in other words, the first switch 331 becomes an ON or short state/short circuit) under the control of the first control circuit 333, so power of a power source connected to the first connector 310 may be supplied to the charging circuit 350 through the first power source line 381, the first switch 331 and the second power source line 382. An electrical connection between the first electrode and the second electrode is blocked (in other words, the first switch becomes an OFF or open state/open circuit/high impedance) under the control of the first control circuit 333, so the supply of power to the charging circuit 350 through the first connector 310 may be stopped although an external electronic device connected to the first connector 310 is a power source.

According to certain embodiments of the disclosure, the first control circuit 333 may manage the charging of the battery 360 in substitute for the processor 370 by controlling the first switch 331 based on at least power applied to the first power source line 381 through the first connector 310. For example, the first control circuit 333 may check a voltage of external power. When the checked voltage belongs to a given voltage range (e.g., 4.5-5.5 V), the first control circuit 333 may control the first switch 331 to supply the external power to the charging circuit 350. When the checked voltage is out of the voltage range, the first control circuit 333 may control the first switch 331 to block (create an open circuit) an electrical connection between the first power source line 381 and the second power source line 382.

According to certain embodiments of the disclosure, the first control circuit 333 may control the first switch 331 further based on information on an external electronic device connected to the first connector 310. According to one embodiment, the first control circuit 333 may be electrically connected to a data pin (e.g., a configuration channel (CC) pin defined in USB type C) of the first connector 310, and may obtain related information (e.g., identification information indicative of the type (e.g., an adaptor, a computer) or an external electronic device, a vendor/manufacturer of the external electronic device) from an external electronic device through the data pin. The first control circuit 333 may use the obtained information as a criterion for the stable charging of the battery 360. That is, the first control circuit 333 may determine whether the first power source line 381 and the second power source line 382 are electrically connected further based on the obtained information. For example, although the checked voltage belongs to a given voltage range, if a vendor of an external electronic device is not identified or an identified vendor does not belong to a given vendor list, the first control circuit 333 may control the first switch 331 to block an electrical connection between the first power source line 381 and the second power source line 382. For another example, although the checked voltage belongs a given voltage range and a vendor of an external electronic device belongs to the vendor list, if an identified type of the external electronic device is not a given type (e.g., if the external electronic device is not a power source adaptor), the first control circuit 333 may control the first switch 331 to block an electrical connection between the first power source line 381 and the second power source line 382.

According to certain embodiments of the disclosure, the first control circuit 333 may be activated by power supplied by a power management module (e.g., the power management module 188 of FIG. 1), and may perform the given operations, including opening or shorting first switch 331. For example, in certain embodiments, the first control circuit 333 can use power supplied by the power management module to provide voltage to bias transistors or diodes forming the switch to realize an open or short circuit.

According to certain embodiments of the disclosure, the first control circuit 333 may be activated by power supplied to the first power source line 381 through the first connector 310, and may perform the given operations. For example, the first control circuit 333 may be an inactive state (e.g., a power source OFF state in which power is not supplied by the battery 360 through a power management module because the power source of the electronic device 300 is an OFF state or the battery 360 is a full discharge state). In such a state, the first control circuit 333 may be activated by power applied through the first connector 310, and may perform the given operations. Thereafter, when power is supplied to a power management module by the given operations of the first control circuit 333, the power management module may be activated. Other control circuits may also be activated when power is supplied to other control circuits (e.g., the second control circuit 343) by the power management module.

According to certain embodiments of the disclosure, the first control circuit 333 may obtain related information (e.g., type, vendor) from external electronic devices through the first connector 310 (using a particular pin), and may perform PD negotiations based on the obtained information. For example, the first control circuit 333 may obtain related information from an external electronic device, connected to the first connector 310, through the first connector 310, and may determine the external electronic device to be a power source and the electronic device 300 to a sink that obtains power from a power source, based on the obtained information. The first control circuit 333 may complete PD negotiations by transmitting information, indicating that the electronic device 300 is a sink, to an external electronic device through the first connector 310. Power from an external electronic device may be supplied to the electronic device 300 through the first connector 310 based on a result of such negotiations.

According to certain embodiments of the disclosure, the second switch 341 may selectively connect the second connector 320 to the charging circuit 350 by controlling whether third power source line 383 and fourth power source line 384 form an open circuit or short circuit. For example, the first electrode of the second switch 341 may be electrically connected to the power source pin (e.g., Vbus pin) of the second connector 320 through the third power source line 383. The second electrode of the second switch 341 may be electrically connected to the charging circuit 350 through the fourth power source line 384. The first electrode and the second electrode are electrically connected under the control of the second control circuit 343, so power of an external power source connected to the second connector 320 may be supplied to the charging circuit 350 through the third power source line 383, the second switch 341 and the fourth power source line 384. An electrical connection between the first electrode and the second electrode is blocked (open circuit or high impedance) under the control of the second control circuit 343, so the supply of power to the charging circuit 350 through the second connector 320 may be stopped although an external electronic device connected to the second connector 320 is a power source.

According to certain embodiments of the disclosure, the second control circuit 343 controls the second switch 341, and may perform operations substantially identical with the operations of the first control circuit 333.

According to certain embodiments of the disclosure, the second control circuit 343 may be activated by power supplied by a power management module (e.g., the power management module 188 of FIG. 1), and may perform the given operations.

According to certain embodiments of the disclosure, the second control circuit 343 may be activated by power applied to the third power source line 383 through the second connector 320, and may perform the given operations. For example, the second control circuit 343 may be an inactive state (e.g., a power source OFF state). At this time, the second control circuit may be supplied with power through the third power source line 383, and may perform the given operations using the power. Power may be supplied to a power management module by the given operations of the second control circuit 343. The power management module may supply power to other control circuits (e.g., the first control circuit 333).

Multiple External Electronic Devices Charging Battery

The second power source line 382 is electrically connected to the fourth power source line 384. The first connector 310 can be connected to one power providing external electronic device while second connector 320 can be connected to another power providing external electronic device. If the first control circuit 333 shorts first power source line 381 with second power source line 382, and second control circuit 343 shorts third power source line 383 with fourth power source line 384, any one of the external electronic devices may be damaged. For example, a case may occur where the first control circuit 333 shorts the first switch 331 because the first control circuit 333 receives a first voltage that is within a set first voltage range, and a second control circuit 343 shorts the second switch 341 because it receives a second voltage that is within a predetermined second voltage range different from the first voltage range. Current may flow backward from one of external electronic devices that supplies power having a higher voltage to the other. The external electronic device that receives the current can be damaged, as a result.

Preventing Countercurrent

According to one embodiment, the first voltage range may be substantially the same as the second voltage range. Accordingly, a countercurrent possibility may be reduced. According to another embodiment, the first voltage range and the second voltage range are set differently, but a circuit configured to prevent current, input to any one of the connectors 310 and 320, from flowing backward to the other connector through the power source lines 381~384 may be additionally configured in the electronic device 300.

According to certain embodiments of the disclosure, the processor 370 (e.g., the processor 120 of FIG. 1) may be electrically connected to other elements (e.g., the first connector 310, the second connector 320, the first switch 331, the second switch 341, the first control circuit 333, the second control circuit 343) using various communication methods (e.g., the bus, GPIO, SPI, or MIPI), although not shown. When the processor 370 switches from an inactive state to an active state, the processor 370 may be electrically connected to some of the switches 331 and 341 and may recognize that both the switches 331 and 341 are in a power supplying state (ON state). When both the switches are the ON state, the processor 370 may change one of the switches to an OFF state (in the case where there are more than two switches, the processor 370 may change all but one of the switches to an OFF state) so that the battery 360 is charged with only one connector.

A target that will be changed to the OFF state may be determined in various ways. According to one embodiment, the processor 370 may arbitrarily determine the target.

According to another embodiment, the target may be determined based on ranking information differently given in the connectors 310 and 320. For example, both the connectors 310 and 320 may be designated for PD and data communication. In PD communication, one of the connectors 310 and 320 may be assigned higher ranking than the other. The processor 370 may determine a switch, corresponding to a connector assigned with relatively lower ranking, to be a target to be changed into an OFF state. For example, the first connector 310 may have priority over the second connector 320 in PD communication. Accordingly, the second switch 341 corresponding to the second connector 320 may be turned off.

According to yet another embodiment, the processor 370 may obtain related information (e.g., type, vendor) from external electronic devices through the connectors 310 and 320, and may determine the target based on the obtained information. For example, if one (first external electronic device) of external electronic devices is identified as an adaptor and the other (second external electronic device) thereof is identified to be not an adaptor, a switch corresponding to the second external electronic device may be determined to be a target to be changed to an OFF state. For another example, if one (first external electronic device) of external electronic devices is identified as a vendor and the other (second external electronic device) thereof is identified to be not a vendor (or, if a vendor does not belong to a given vendor list although it is identified), a switch corresponding to the second external electronic device may be determined to be a target to be changed to an OFF state.

An overvoltage (e.g., electro static discharge (ESD), electrical over stress (EOS)) may flow into the electronic device 300 through the connectors 310 and 320. Accordingly, elements of the electronic device 300, for example, the control circuit 333, 343 may be broken or damaged. According to certain embodiments of the disclosure, an electronic part for preventing the breakage or damage of the control circuits 333 and 343 may be additionally configured in the electronic device 300. For example, transient voltage suppressor (TVS) diodes for clipping an overvoltage may be electrically connected to the power source lines 381 and 383, respectively, as a blocking agent for an overvoltage inflow.

An electronic part for preventing power from being supplied to the charging circuit 350 through a corresponding connector when the control circuits 333 and 343 are broken or damaged nevertheless may be additionally configured in the electronic device 300.

Figure 4:
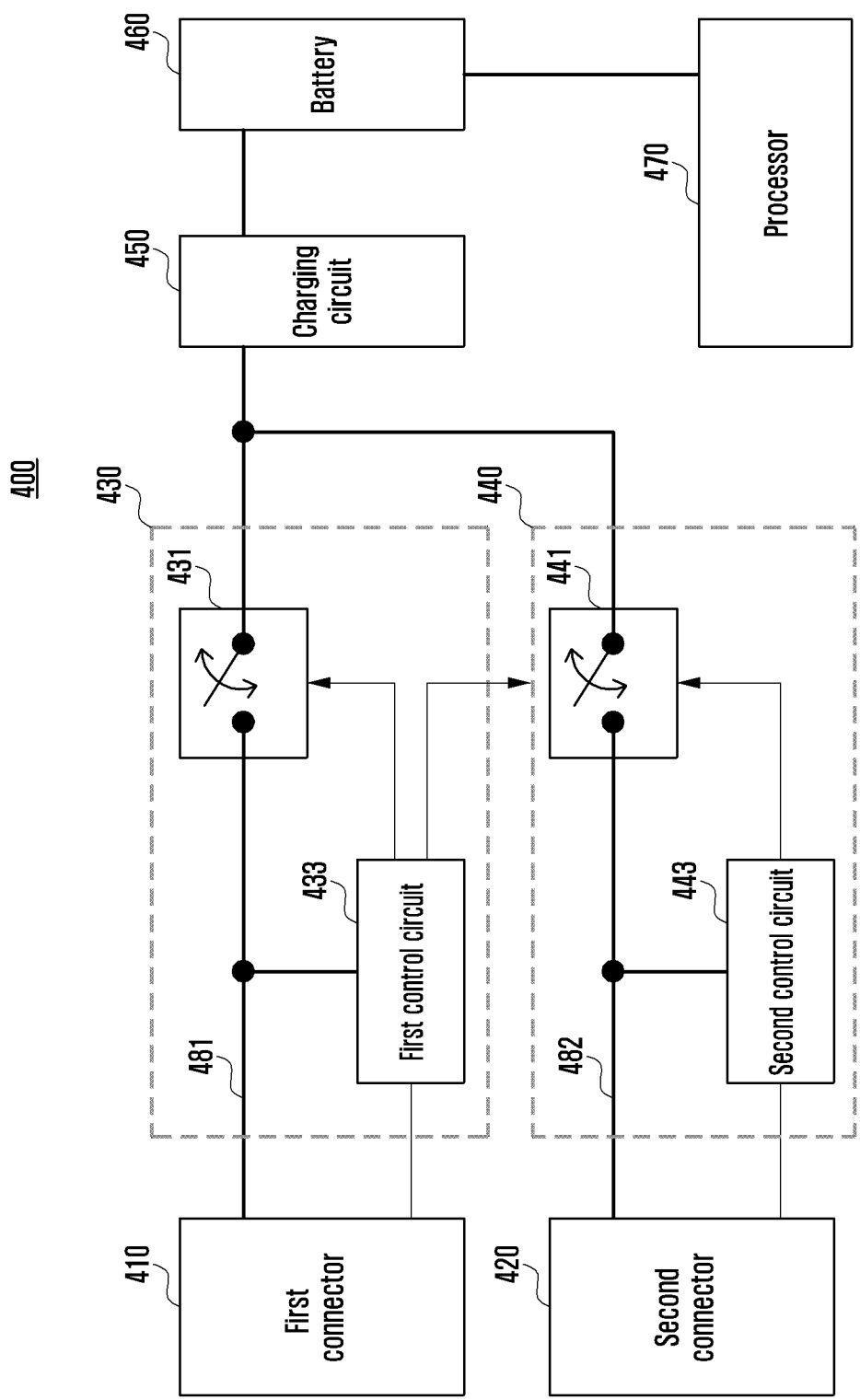
FIG. 4 shows an electronic device configured to perform stable battery charging without a collision between pieces of power by electrically connecting only one of a plurality of connectors to a charging circuit when a plurality of pieces of power is connected to the plurality of connectors at the same time according to certain embodiments of the disclosure.

FIG. 4 shows an electronic device configured to perform stable battery charging without a collision between external electronic devices connected to connectors 410 and 420 by electrically connecting only one of a plurality of connectors to a charging circuit when a plurality of external electronic devices are connected to the plurality of connectors at the same time.

Referring to FIG. 4, the electronic device 400 (e.g., the electronic device 101 of FIG. 1) may include a first connector 410, a second connector 420, a first switching block 430, a second switching block 440, a charging circuit 450, a battery 460 and a processor 470, which are substantially the same as the elements of FIG. 3 and perform the same operations as them. However, first switching block 430 can control second switching block 440.

According to certain embodiments of the disclosure, the first switching block 430 or the first control circuit 433 may supply power to the charging circuit 450 through one of the first connector 410 and the second connector 420 by delivering a control signal to the first switch 431 and the second switching block 440 based on power (e.g., voltage) applied to the first power source line 481 through the first connector 410. According to one embodiment, when external power sources are electrically connected to the first connector 410 and the second connector 420, respectively, the first switching block 430 may turn on a first switch 431 and the second switching block 440 may turn off a second switch 441. The first switching block 430 may deliver a state signal to the second switching block 440. The state signal may be a signal for turning off the second switch 441.

Alternatively, the state signal may be a signal for stopping power from being supplied (e.g., stopping the supply of power) to the charging circuit 450 through the second connector 420. According to certain embodiments of the disclosure, the first control circuit 433 of the first switching block 430 may control the first switch 431 and the second switching block 440 based on power supplied to a first power source line 481 through the first connector 410, so the battery 460 is charged through one of the first connector 410 and the second connector 420.

According to one embodiment, the first connector 410 may have priority over the second connector 420 in PD communication. Accordingly, when multiple external electronic devices supplying power satisfying a given condition are supplied to the electronic device 400 through the two connectors 410 and 420, the first switch 431 corresponding to the first connector 410 may be turned on and the second switch 441 corresponding to the second connector 420 may be turned off.

According to certain embodiments of the disclosure, when a voltage of first power applied to the first power source line 481 is out of a given voltage range, the first control circuit 433 may output a control signal for turning off the first switch 431 to the first switch 431, and may output a first state signal (e.g., a voltage of a low level) indicative of the first state of the first power (e.g., indicating that a voltage of the first power is out of the given voltage range) to the second switch block 440. When a voltage of power applied to the first power source line 481 is within the given voltage range, the first control circuit 433 may output a control signal for turning on the first switch 431 to the first switch 431, and may output the second state signal (e.g., a voltage of a high level) indicative of the second state of the first power (e.g., indicating that a voltage of the first power is within the given voltage range) to the second switching block 440.

According to certain embodiments of the disclosure, the first control circuit 433 may control the first switch 431 and the second switching block 440 based on information on an external electronic device connected to the first connector 410. For example, when information obtained from the external electronic device through the first connector 410 satisfies a second condition, the first control circuit 433 may output a signal for shorting to the first switch 431 and output the second state signal to the second switching block 440. The second condition may include a condition that a vendor of the external electronic device belongs to a given vendor list and/or a condition that an identified type of the external electronic device has been given, for example. For another example, when information obtained from the external electronic device the first connector 410 satisfies the second condition in addition to the first condition that the checked voltage belongs to the given voltage range, the first control circuit 433 may output a signal for shorting to the first switch 431 and output the second state signal to the second switching block 440.

According to certain embodiments of the disclosure, the second switching block 440 performs operations substantially identical with the operations of the second switching block 340 of FIG. 3, but may stop power from being supplied (e.g., stop the supply of power) to the charging circuit 450 through the second connector 420 when the second state signal (i.e., an instruction to turn off the second switch 441) is obtained from the first control circuit 433.

According to one embodiment, a first state signal and a second state signal may be received by the second control circuit 443. The second control circuit 443 may turn on the second switch 441 based on the first state signal obtained from the first control circuit 433 while a voltage of power applied to the second power source line 482 through the second connector 420 is within a given voltage range. The second control circuit 443 may turn off the second switch 441 based on a voltage level of the power applied to a second power source line 482 through the second connector 420, which is out of a given voltage range, although the first state signal is obtained from the first control circuit 433. Although a voltage of power applied to the second power source line 482 through the second connector 420 is within the given voltage range, the second control circuit 443 may turn off the second switch 441 based on the second state signal obtained from the first control circuit 433.

According to another embodiment, although not shown, the second switching block 440 may further include an auxiliary control circuit configured to prohibit an electrical connection between the second connector 420 and the charging circuit 450 based on a second state signal obtained from the first control circuit 433. For example, the auxiliary control circuit may turn on the second switch 441 based on an ON signal obtained from the second control circuit 443 and a first state signal obtained from the first control circuit 433. The auxiliary control circuit may turn off the second switch 441 based on an OFF signal obtained from the second control circuit 443 although the first state signal is obtained from the first control circuit 433. The auxiliary circuit may turn off the second switch 441 based on the second state signal obtained from the first control circuit 433 although an ON signal is obtained from the second control circuit 443.

In certain embodiments, a signal from the first control circuit 433 and a signal from second control circuit 443 can be received by an AND gate via an inverter. If the first switch 431 is ON or shorted, the signal from the first control circuit 433 is set high. The inverter inverts the high signal (e.g., the second state signal) to low, which is received by the AND gate. As a result, when the signal of the first control circuit 433 is high, regardless of the output of the second control circuit 443, the output of the AND gate is low, resulting in switch 441 being OFF, or open circuit. When the signal of the first control circuit 433 is low (the first switch 433 is OFF), the output of the second control circuit 443 becomes output of the AND gate, thereby allowing the second switch 441 to be open or shorted.

Figure 5:
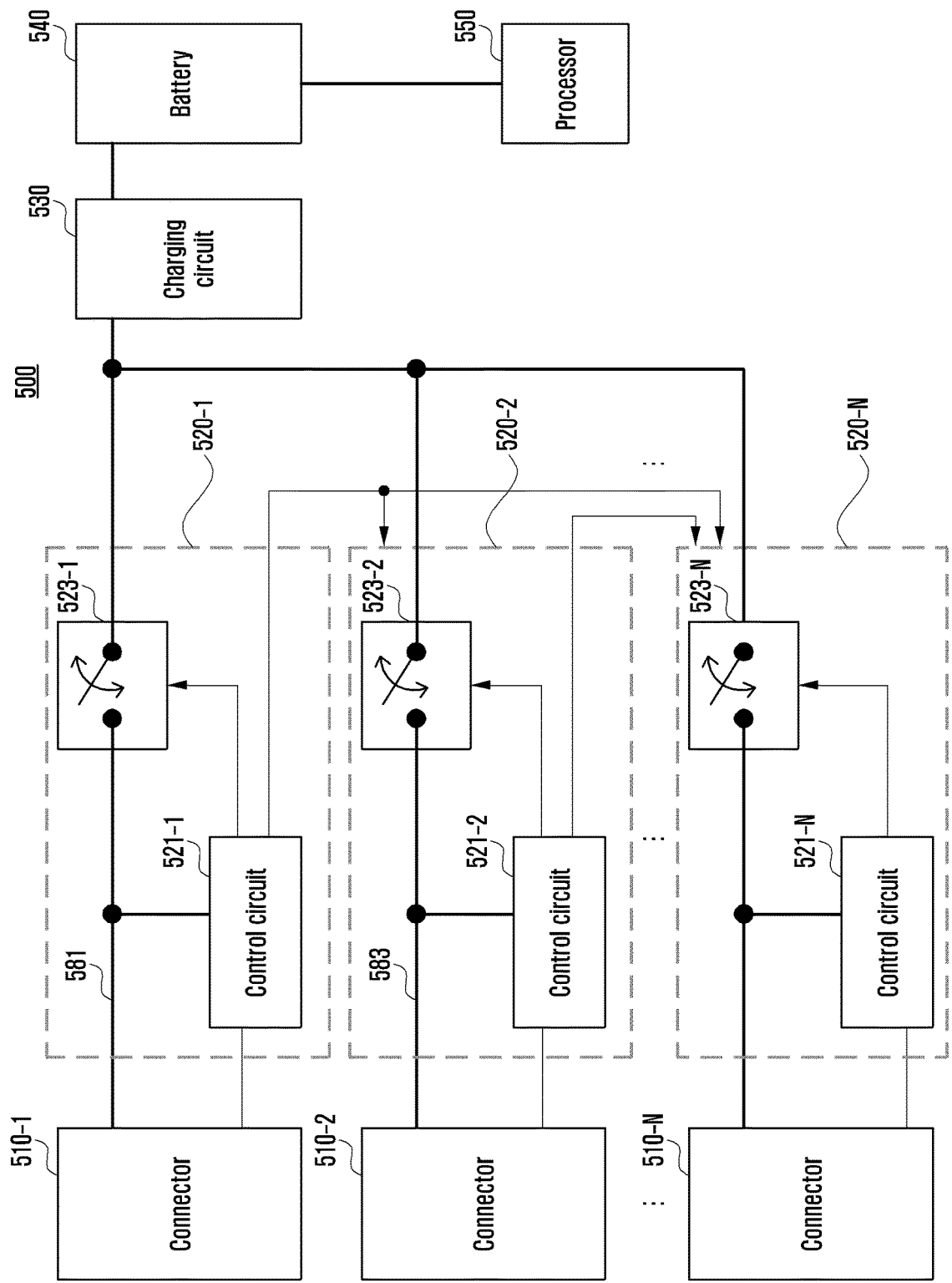
FIG. 5 shows an electronic device, further including one or more connectors of the electronic device of FIG. 4 and one or more switching blocks corresponding to the one or more connectors, according to certain embodiments of the disclosure.

FIG. 5 shows an electronic device 500 capable of connection to N different external electronic devices providing charging power. Electronic device 500 ensures that no more than one external electronic device connected to connectors 510-1 . . . 510-N are electrically connected to the charging circuit 530. Blocks 520-1 . . . 520-N-1 control blocks 520-2 . . . 520-N. In certain embodiments, this may occur in cascading fashion, wherein the first one of blocks 520-1, 520-2, . . . 520-N-1 connecting an electrical device via connector 510-1, 510-2, . . . 510-N-1 inhibits each of the successive blocks 510-2 . . . 510-N from connecting another electronic device connected via connector 510-2 . . . 510-N.

FIG. 5 shows an electronic device, further including one or more connectors of the electronic device of FIG. 4 and one or more switching blocks corresponding to the one or more connectors, according to certain embodiments of the disclosure. Referring to FIG. 5, the electronic device 500 (e.g., the electronic device 101 of FIG. 1) may include connectors 510-1, 510-2, . . . , 510-N, switching blocks 520-1, 520-2, . . . , 520-N, a charging circuit 530, a battery 540 and a processor 550.

According to certain embodiments of the disclosure, rankings of PD communication may be differentially assigned to the connectors 510-1, 510-2, . . . , 510-N. For example, h-th ranking may be assigned to the connector 510-$h$ (h=1, 2, . . . , or N).

According to certain embodiments of the disclosure, when power applied to the electronic device 500 through the connector 510-$n$ (n=1, 2, . . . , or N−1) satisfies a given condition (e.g., when a voltage is within the given voltage range), the control circuit 521-$n$ of the switching block 520-$n$ may output an ON signal for electrically connecting the connector 510-$n$ to the charging circuit 530 to the switch 510-$n$ and outputs a signal (e.g., the second state signal of FIG. 4) for preventing other connector(s) 510-$n$+1~N, assigned lower ranking than the connector 510-$n$, from being electrically connected to the charging circuit 530 to other switching block(s) 520-$n$+1~N. Accordingly, when a plurality of external electronic device providing power to the electronic device 500 through a plurality of connectors at the same time, stable charging of the battery 540 can be performed without a collision between the multiple external electronic devices. For example, when power applied to a first power source line 581 through the first connector 510-1 satisfies a given condition, the first control circuit 521-1 of the first switching block 520-1 may output an ON signal to the first switch 523-1 of the first switching block 520-1, and may output a block signal (first control signal) (e.g., the second state signal of FIG. 4) to all the remaining switching blocks 510-2, . . . , 510-N. When power applied to the first power source line 581 through the first connector 510-1 does not satisfy a given condition, the first control circuit 520-1 may output an OFF signal to a first switch 523-1 and output a block release signal (second control signal) (e.g., the first state signal of FIG. 4) to all the remaining switching blocks 510-2, . . . , 510-N. When power applied to a second power source line 583 through the second connector 510-2 satisfies a given condition, the second control circuit 521-2 of the second switching block 520-2 may output an ON signal to the second switch 523-2 of the second switching block 520-2 and output a block signal to all the remaining switching blocks . . . , 520-N except the first switching block 520-1. When power applied to the second power source line 583 through the second connector 510-2 does not satisfy a given condition, the second control circuit 521-2 may output an OFF signal to the second switch 523-2 and output a block release signal to all the remaining switching blocks . . . , 520-N except the first switching block 520-1.

According to certain embodiments of the disclosure, when power applied to the electronic device 500 through the connector 510-$n$ satisfies a given first condition and information obtained from an external electronic device through the connector 510-$n$ satisfies a second condition, the control circuit 521-$n$ of the switching block 520-$n$ may output, to the switch 523-$n$, an ON signal for electrically connecting the connector 510-$n$ to the charging circuit 530, and may output, to other switching block(s) 520-$n$+1~N, a signal (e.g., the second state signal of FIG. 4) for preventing other connector(s) 510-$n$+1~N, assigned lower ranking than the connector 510-$n$, from being electrically connected to the charging circuit 530.

As noted above, the signal preventing other connectors can be a high signal that is inverted and received by an AND gate at each of the switches 523-2 . . . 523-N.

According to certain embodiments of the disclosure, the control circuits 521-1, 521-2, . . . , 521-N may be a power source OFF state in which power is not supplied by the battery 540 through a power management module because the power source of the electronic device 500 is an OFF state or the battery 540 is a full discharge state. In this case, power may be supplied to the control circuit 521-$k$ through the connector 510-$k$ ($k$=1, 2, . . . , or N). The control circuit 521-$k$ may perform given operations using the power, so the switch 523-$k$ is turned on. Accordingly, the power management module may be activated to supply power to all the remaining control circuits.

According to certain embodiments of the disclosure, one or more charging circuits may be additionally in provided in the electronic device 500. For example, a first charging circuit (e.g., the charging circuit 530) may be electrically connected to some of the switching blocks 520-1, 520-2, . . . , 520-N, and may charge the battery 540 using power applied through a corresponding switching block. A second charging circuit (not shown) may be electrically connected to different some of the switching blocks 520-1, 520-2, . . . , 520-N except, and may charge the battery 540 using power applied through a corresponding switching block.

Figure 6:
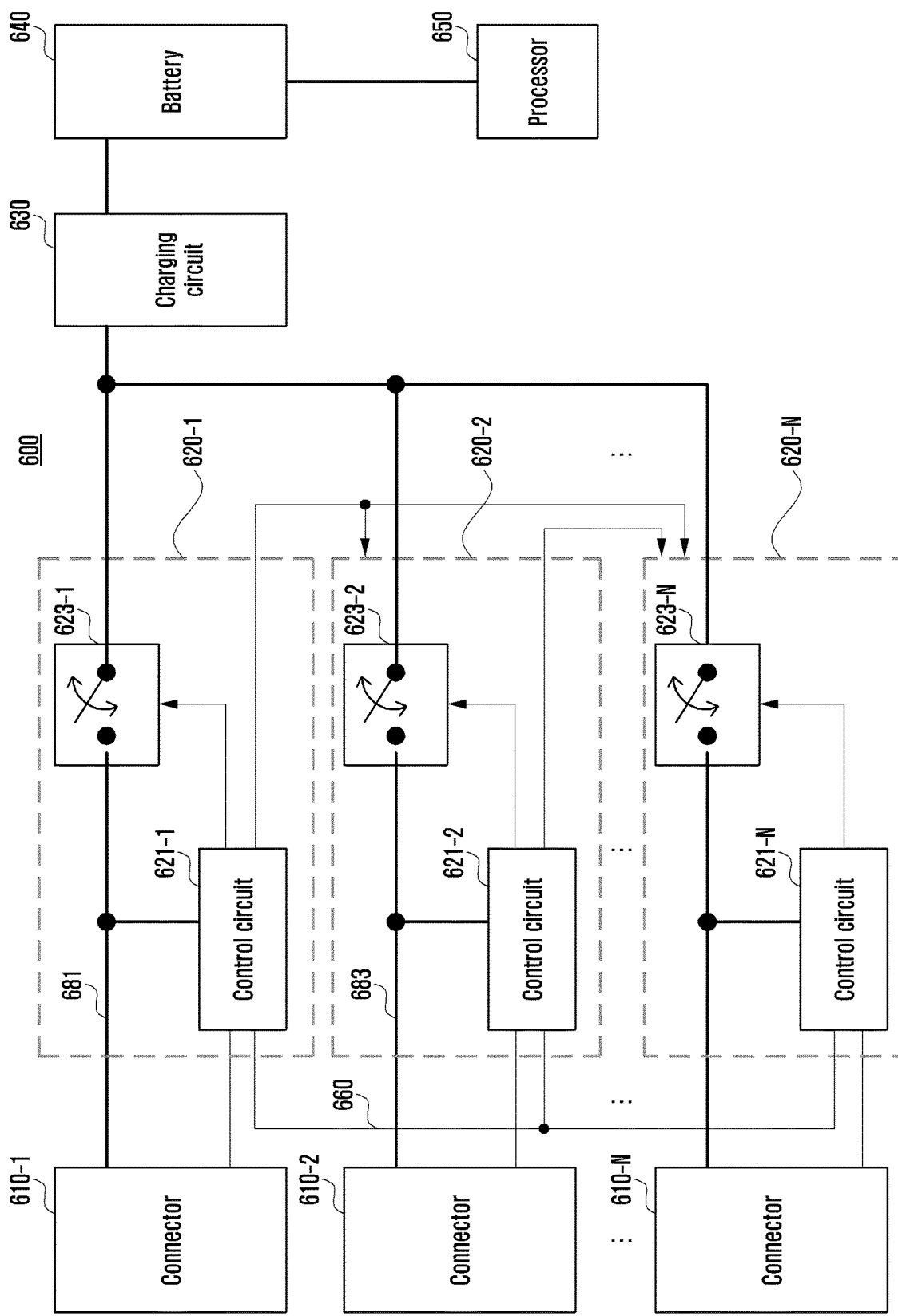
FIG. 6 shows an electronic device substantially identical with the electronic device of FIG. 5, but further configured to change a charging path according to certain embodiments of the disclosure.

In FIG. 6, switching blocks 620-1 . . . 620-N may ensure that only one block connects charging circuit 630 to one external electronic device providing power in a cascading fashion. However, a blocked or inhibited switching block 620-2 may provide a signal to a higher switching blocks, e.g., switching block 620-1, which causes a higher switching blocks to change from ON (shorted) to OFF (open circuit), thereby allowing switching block 620-2 to connect an external electronic device providing power to the charging circuit 630.

FIG. 6 shows an electronic device further configured to change a charging path according to certain embodiments of the disclosure. Referring to FIG. 6, the electronic device 600 (e.g., the electronic device 101 of FIG. 1) may include connectors 610-1, 610-2, . . . , 610-N, switching blocks 620-1, 620-2, . . . , 620-N, a charging circuit 630, a battery 640 and a processor 650. Three or more connectors and three or more switching blocks have been illustrated as being included in the electronic device 600, but two connectors and two switching blocks may be configured in the electronic device 600.

According to certain embodiments of the disclosure, the control circuit 621-$m$ of a switching block 620-$m$ ($m$= 2, . . . , or N) may transmit, to at least the control circuit 621-$m$-1 of other control circuits, information (e.g., a power value, a voltage value, a current value) indicative of the state of power applied to the electronic device 600 through the connector 610-$m$. The control circuit 621-$m$-1 may change the state of a switch 623-$m$-1 (e.g., ON→OFF) and change the state of a signal output to the switching block(s) 620-$m$~N (e.g., the block signal of FIG. 4→the block release signal of FIG. 4), based on state information obtained from a control circuit 621-$m$. The state information may be transmitted and received through a bus 660 configured to electrically connect all the control circuits 621-1, 621-2, . . . , 621-N or a signal line (not shown) configured to electrically directly connect the control circuit 621-$m$ and the control circuit 621-$m$-1, for example.

For example, a plurality of power sources may be connected to the first connector 610-1 and the second connector 610-2, respectively. Accordingly, the first control circuit 621-1 and the second control circuit 621-2 may be activated by power supplied by the power sources through corresponding connectors. When first power applied to a first power source line 681 through the first connector 610-1 satisfies a given first condition, the first control circuit 621-1 may output an ON signal to the first switch 623-1 of the first switching block 620-1, and may output a first block signal (e.g., the second state signal of FIG. 4) to all the remaining switching blocks 620-2, . . . , 620-N. When second power applied to a second power source line 683 through the second connector 610-2 satisfies a given second condition, the second control circuit 621-2 may transmit information (e.g., a power value, a voltage value, a current value) indicative of the state of the second power to at least the first control circuit 621-1 of other control circuits. The first control circuit 621-1 may determine power corresponding to a better charging condition (e.g., high-speed charging) by comparing the state of the first power with the state of the second power. For example, when a voltage of the first power is about 5 V and a voltage of the second power is about 9 V, the first control circuit 621-1 may determine the second power to be more suitable for high-speed charging. For another example, when the first power is 5 V/1 A and the second power is about 5 V/3 A, the first control circuit 621-1 may determine the second power to be more suitable for high-speed charging. The first control circuit 621-1 may output an OFF signal to the first switch 623-1 and output a block release signal (e.g., the first state signal of FIG. 4) to all other switching blocks 620-2, . . . , 620-N as subsequent operations for the determination. As described above, when the state of the first switch 623-1 is changed from ON to OFF and the state of a signal output to the second switching block 620-2 is changed from "block" to "block release", a connector for charging may be changed from the first connector 610-1 to the second connector 610-2.

According to certain embodiments of the disclosure, the control circuit 621-$m$ of the switching block 620-$m$ may transmit information, obtained from an external electronic device through the connector 610-$m$, to at least the control circuit 621-$m$-1 of other control circuits. The control circuit 621-$m$-1 may change the state of the switch 623-$m$-1 (e.g., ON→OFF) and change the state of a signal output to the switching block(s) 623-m~N (e.g., the block signal of FIG. 4→the block release signal of FIG. 4), based on the information related to the external electronic device obtained from the control circuit 621-m. For example, the second control circuit 621-2 may transmit information related to an external electronic device, which is obtained from the second connector 610-2, to at least the first control circuit 621-1 of other control circuits. The first control circuit 621-1 may change a charging path based on the information obtained from the second control circuit 621-2. For example, if a vendor of a first external electronic device connected to the first connector 610-1 is not identified or does not belong to a given vendor list although the vendor is identified, whereas a vendor of a second external electronic device connected to the second connector 610-2 has been given, the first control circuit 621-1 may determine the second external electronic device to be a device more suitable for the stable charging of the battery 640. For another example, if the type of first external electronic device connected to the first connector 610-1 has not been given, whereas the type of second external electronic device connected to the second connector 610-2 has been given (e.g., a power source adaptor), the first control circuit 621-1 may determine the second external electronic device to be a device more suitable for the stable charging of the battery 640. The first control circuit 621-1 may change the state of the first switch 623-1 from ON to OFF and change the state of a signal, output to other switching blocks 620-2, . . . , 620-N, from "block" to "block release", as subsequent operations for the determination.

Figure 7:
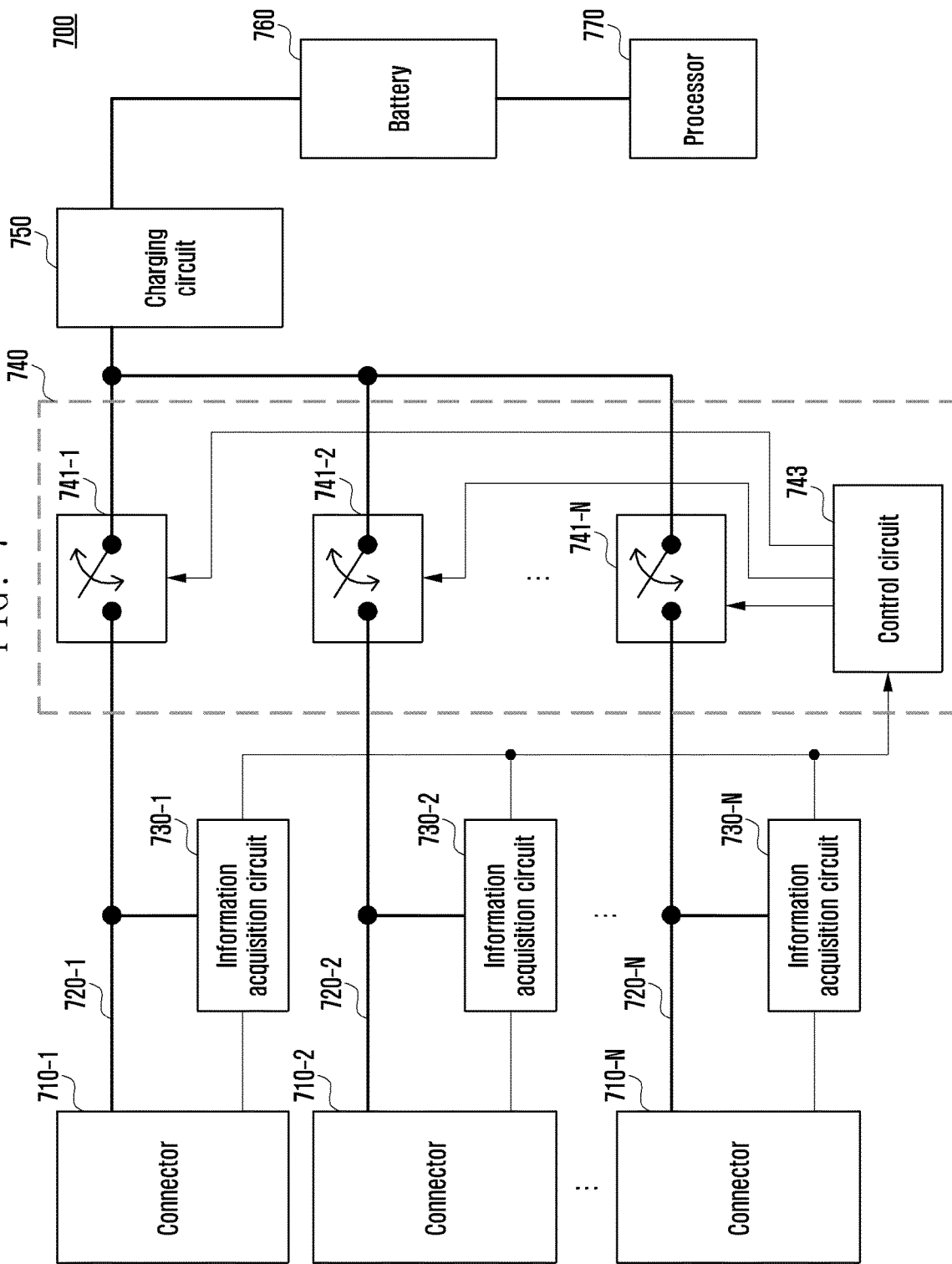
FIG. 7 shows an electronic device configured to connect a charging circuit to at least one of a plurality of connectors according to certain embodiments of the disclosure.

In FIG. 7, each switch is associated with an information acquisition circuit 730-1 . . . 730-N which communicate with one control circuit 743. The control circuit 743 controls each of the switches 741-1 . . . 741-N such that one switch is selected based at least in part on the information provided by the information acquisition circuits 730-1 . . . 730-N.

FIG. 7 shows an electronic device configured to connect a charging circuit to at least one of a plurality of connectors according to certain embodiments of the disclosure. Referring to FIG. 7, the electronic device 700 (e.g., the electronic device 101 of FIG. 1) may include connectors 710-1, 710-2, . . . , 710-N, power source lines 720-1, 720-2, . . . , 720-N, information acquisition circuits 730-1, 730-2, . . . , 730-N, a switching block 740, a charging circuit 750, a battery 760 and a processor 770.

According to certain embodiments of the disclosure, the connector 710-j (j=1, 2, . . . , or N) is one element configuring the connection terminal 178 of FIG. 1, and may include a plurality of pins for PD and data communication. Three or more connectors, three or more power source lines, and three or more information acquisition circuits have been illustrated as included in the electronic device 700, but two connectors, two power source lines, and two information acquisition circuits may be configured in the electronic device 700.

According to certain embodiments of the disclosure, the power source line 720-j may electrically connect the power source pin of the connector 710-j to the switching block 740.

According to certain embodiments of the disclosure, the information acquisition circuit 730-j is electrically connected to the power source line 720-j, and thus may obtain state information (e.g., a voltage value, a current value, a power value) of power applied to the power source line 720-j through the power source pin of the connector 710-j. The information acquisition circuit 730-j may be electrically connected to the data pin of the connector 710-j, and may obtain information (e.g., type, vendor) of an external electronic device, electrically connected to the connector 710-j, through the data pin of the connector 710-j. The information acquisition circuit 730-j may transmit the obtained state information and the obtained information related to the external electronic device to the switching block 740.

According to certain embodiments of the disclosure, the switching block 740 may obtain information from the information acquisition circuits 730-1, 730-2, . . . , 730-N, and may electrically connect at least one of the power source lines 720-1, 720-2, . . . , 720-N to the charging circuit 750 based on information obtained from at least one of the information acquisition circuits 730-1, 730-2, . . . , 730-N. According to one embodiment, the switching block 740 may include switches 741-1, 741-2, . . . , 741-N and a control circuit 743.

According to certain embodiments of the disclosure, the switch 741-j may electrically connect the power source line 720-j to the charging circuit 750 based on an ON signal obtained from the control circuit 743. The switch 741-j may block an electrical connection between the power source line 720-j and the charging circuit 750 based on an OFF signal obtained from the control circuit 743.

According to certain embodiments of the disclosure, the control circuit 743 may obtain information from the information acquisition circuits 730-1, 730-2, . . . , 730-N, and may turn on at least one of the switches 741-1, 741-2, . . . , 741-N based on information obtained from at least one of the information acquisition circuits 730-1, 730-2, . . . , 730-N.

According to one embodiment, when state information of power obtained from the information acquisition circuit 730-j satisfies a given first condition (e.g., a first condition that a voltage of the received power belongs to a given voltage range), the control circuit 743 may turn on the switch 741-j so that the battery 760 is charged through the connector 710-j. In this case, all the switches 741-1, 741-2, . . . , 741-N may be turned on under the same first condition. In contrast, a first condition for turning on at least one of the switches 741-1, 741-2, . . . , 741-N may be different from a first condition for turning on at least another switch. Accordingly, the battery 760 can be charged because one or more switches are turned on by such an operation of the control circuit 743.

According to another embodiment, the control circuit 743 may obtain state information of power from a plurality of information acquisition circuits, and may identify that state information satisfying the first condition is plural. When state information satisfying the first condition is plural, the control circuit 743 may select a switch to be turned on based on given ranking information. For example, when both state information of power supplied through the connector 710-1 of the first ranking and state information of power supplied through the connector 710-2 of the second ranking satisfy the first condition in the state in which h-th ranking has been assigned to the connector 710-h (h=1, 2, . . . , or N), the control circuit 743 may turn on only the switch 741-1 corresponding to the connector 710-1 of the first ranking. Accordingly, the battery 760 can be charged because one switch is turned on by such an operation of the control circuit 743.

According to yet another embodiment, when information related to an external electronic device obtained from the information acquisition circuit 730-j satisfies a given second condition (e.g., a condition that the type of external electronic device has been given) in addition to the satisfaction of the first condition, the control circuit 743 may turn on the switch 741-j. For example, the control circuit 743 may turn on only the second switch 741-2 when the type of external electronic device connected to the connector 710-2 of the second ranking is identified as a power source adaptor and the type of external electronic device connected to the connector 710-1 of the first ranking is identified as a different device (e.g., a computer) not a power source adaptor although both state information of power supplied through the connector 710-1 of the first ranking and state information of power supplied through the connector 710-2 of the second ranking satisfy the first condition.

According to yet another embodiment, if state information satisfying the first condition is plural, the control circuit 743 may select a switch to be turned on by performing a comparison between the pieces of state information based on a given third condition (e.g., a better charging condition of FIG. 6).

According to any embodiment, the switches 741-1, 741-2, . . . , 741-N may be substituted with one switch. For example, the switches 741-1, 741-2, . . . , 741-N may be substituted with a multiplexer. The control circuit 743 may control the multiplexer so that one of the power source lines 720-1, 720-2, . . . , 720-N is electrically connected to the charging circuit 750.

Figure 8:
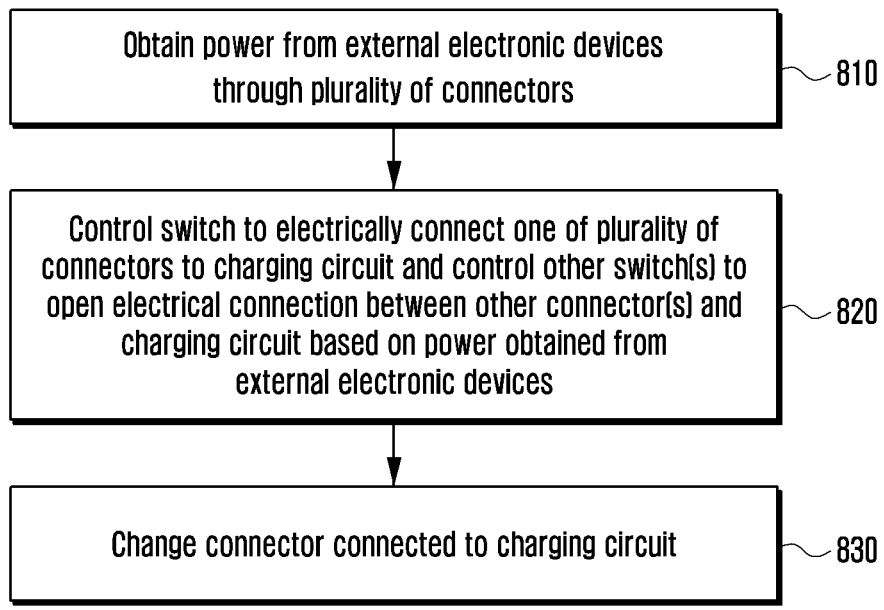
FIG. 8 is a flowchart for illustrating operations for an electronic device to manage charging according to certain embodiments of the disclosure.

FIG. 8 is a flowchart for illustrating operations for an electronic device to manage charging according to certain embodiments of the disclosure.

According to certain embodiments of the disclosure, at operation 810, at least one control circuit (e.g., the control circuits 433 and 443 of FIG. 4, the control circuits 521-1~N of FIG. 5, the control circuits 621-1~N of FIG. 6, or the control circuit 743 of FIG. 7) of an electronic device (e.g., the electronic device 400 of FIG. 4, the electronic device 500 of FIG. 5, the electronic device 600 of FIG. 6 or the electronic device 700 of FIG. 7) may obtain power from external electronic devices through a plurality of connectors (e.g., the connectors 410 and 420 of FIG. 4, the connectors 510-1~N of FIG. 5, the connectors 610-1~N of FIG. 6, or the connectors 710-1~N of FIG. 7).

According to certain embodiments of the disclosure, at operation 820, at least one control circuit may control a switch (e.g., the first switch 431 of FIG. 4, the switch 523-1 of FIG. 5, the switch 623-1 of FIG. 6, or the switch 741-1 of FIG. 7) to electrically connect one (e.g., the first connector 410 of FIG. 4, the connector 510-1 of FIG. 5, the connector 610-1 of FIG. 6, or the connector 710-1 of FIG. 7) of the connectors to a charging circuit (e.g., the charging circuit 450 of FIG. 4, the charging circuit 530 of FIG. 5, the charging circuit 630 of FIG. 6, or the charging circuit 750 of FIG. 7), and may control other switch(es) (e.g., the second switch 441 of FIG. 4, the switches 523-2~N of FIG. 5, the switches 623-2~N of FIG. 6, or the switches 741-2~N of FIG. 7) to open an electrical connection between other connector(s) (e.g., the second connector 420 of FIG. 4, the connectors 510-2~N of FIG. 5, the connectors 610-2~N of FIG. 6, or the connectors 710-1~N of FIG. 7) and the charging circuit based on the power obtained from the external electronic devices.

According to certain embodiments of the disclosure, at least one control circuit may additionally perform operation 830 of changing a connector connected to the charging circuit. For example, referring to FIG. 6, when second power applied to the second power source line 682 through the second connector 610-2 satisfies a given second condition, the second control circuit 621-2 may transmit information (e.g., a power value, a voltage value, a current value) indicative of the state of the second power to the first control circuit 621-1. If the state of the second power corresponds to a better charging condition (e.g., high-speed charging) than the state of first power, the first control circuit 621-1 may perform an operation of outputting an OFF signal to the first switch 623-1 and an operation of outputting a block release signal to all the remaining switching blocks 620-2, . . . , 620-N as an embodiment of operation 830.

An electronic device (e.g., the electronic device 400 of FIG. 4, the electronic device 500 of FIG. 5, or the electronic device 600 of FIG. 6) according to certain embodiments of the disclosure may include a battery, a charging circuit electrically connected to the battery, a first connector, a second connector, a first switch configured to electrically connect the first connector to the charging circuit or to open an electrical connection between the first connector and the charging circuit, a second switch configured to electrically connect the second connector to the charging circuit or to open an electrical connection between the second connector and the charging circuit, a first control circuit configured to control the first switch to electrically connect the first connector to the charging circuit and to control the second switch to open the electrical connection between the second connector and the charging circuit based on first power supplied by a first external electronic device through the first connector, and a second control circuit configured to control the second switch to electrically connect the second connector to the charging circuit based on second power supplied by a second external electronic device through the second connector.

The first switch may be configured to electrically connect the first connector to the charging circuit based on a first connection signal output by the first control circuit and to open the electrical connection between the first connector and the charging circuit based on a first open signal output by the first control circuit.

The second switch may be configured to electrically connect the second connector to the charging circuit based on a second connection signal output by the second control circuit and to open the electrical connection between the second connector and the charging circuit based on a the second open signal output by the second control circuit, but to open the electrical connection between the second connector and the charging circuit when a first control signal (e.g., the second state signal of FIG. 4) to open the electrical connection between the second connector and the charging circuit is output by the first control circuit although the second connection signal is output by the second control circuit.

The first control circuit may be configured to output the first connection signal and the first control signal based on a state of the first power satisfying a given first condition and to output the first open signal and a second control signal (e.g., the first state signal of FIG. 4) to connect the second connector to the charging circuit based on the state of the first power not satisfying the first condition.

The second switch may be configured to electrically connect the second connector to the charging circuit based on the second connection signal when the second control signal is output.

The second control circuit may be configured to output the second open signal based on the first control signal obtained from the first control circuit.

The electronic device further includes an auxiliary control circuit (e.g., the auxiliary control circuit of FIG. 4). The auxiliary control circuit may be configured to turn on the second switch based on the second connection signal being obtained when the second control signal is obtained and to turn off the second switch based on the second connection signal and the first control signal being obtained.

The first control circuit may be configured to output the first connection signal and the first control signal, when the first condition is satisfied and information obtained from the first external electronic device through the connector satisfies a given second condition.

The information obtained from the first external electronic device may include information indicative of the type or vendor of first external electronic device.

The first control circuit (e.g., the control circuit 621-*m*-1 of FIG. 6) may be configured to obtain information indicative of the state of the second power from the second control circuit (e.g., the control circuit 621-*m* of FIG. 6) and to select the second power as power to be supplied to the charging circuit based on at least information indicative of the state of the first power and information indicative of the state of the second power. The first control circuit (e.g., the control circuit 621-*m*-1 of FIG. 6) may be configured to output the first open signal and the second control signal based on the first power satisfying the first condition and the second power being selected as power to be supplied to the charging circuit.

The first control circuit (e.g., the control circuit 621-*m*-1 of FIG. 6) may be configured to select the second power as the power to be supplied to the charging circuit based on the second power being higher than the first power or a voltage of the second power being higher than a voltage of the first power.

The first control circuit may be configured to output the first open signal and the second control signal when the state of the first power satisfies the first condition, information related to the first external electronic device does not satisfy a given second condition and information related to the second external electronic device satisfies the second condition.

The information related to the second external electronic device may include information indicative of the type or vendor of second external electronic device.

An electronic device (e.g., the electronic device 300 of FIG. 6) according to certain embodiments of the disclosure may include a battery, a charging circuit electrically connected to the battery, a first connector, a second connector, a first switch configured to electrically connect the first connector to the charging circuit or to open an electrical connection between the first connector and the charging circuit, a second switch configured to electrically connect the second connector to the charging circuit or to open an electrical connection between the second connector and the charging circuit, a processor electrically connected to the first switch and the second switch and configured to control the first switch and the second switch, a first control circuit configured to control the first switch to electrically connect the first connector to the charging circuit based on first power supplied by a first external electronic device through the first connector in substitute for the processor when the processor is an inactive state, and a second control circuit configured to control the second switch to electrically connect the second connector to the charging circuit based on second power supplied by a second external electronic device through the second connector in substitute for the processor when the processor is the inactive state.

The first control circuit (e.g., the first control circuit 333 of FIG. 3) may be configured to determine whether to output a first connection signal to electrically connect the first connector to the charging circuit by comparing state information of the first power with a given first condition. The second control circuit (e.g., the second control circuit 343 of FIG. 3) may be configured to determine whether to output a second connection signal to electrically connect the second connector to the charging circuit by comparing state information of the second power with a given second condition. The first condition and the second condition may include the same voltage range (e.g., the first voltage range and second voltage range of FIG. 3 are the same).

An electronic device (e.g., the electronic device 700 of FIG. 7) according to certain embodiments of the disclosure may include a battery, a charging circuit electrically connected to the battery, a first connector, a second connector, one or more switches, one or more control circuits, and a processor. When the processor is an active state, the processor may be configured to control the one or more switches to supply one of first power and second power to the charging circuit, when the first power is supplied by a first external electronic device connected through the first connector and the second power is supplied by a second external electronic device connected through the second connector simultaneously. When the processor is an inactive state, the one or more control circuits may be configured to control the one or more switches to supply at least one of the first power and the second power to the charging circuit, when the first power is supplied through the first connector and the second power is supplied through the second connector simultaneously.

The one or more control circuits (e.g., the information acquisition circuit 730-1~N and control circuit 743 of FIG. 7) may be configured to select one of the first power and the second power as power to be supplied to the charging circuit based on given ranking being differently assigned to the first connector and the second connector.

The one or more control circuits (e.g., the information acquisition circuit 730-1~N and control circuit 743 of FIG. 7) may be configured to select the second power as power to be supplied to the charging circuit by comparing information indicative of the state of the first power with information indicative of the state of the second power.

The one or more control circuits (e.g., the information acquisition circuit 730-1~N and control circuit 743 of FIG. 7) may be configured to select the second power as the power to be supplied to the charging circuit based on the second power being higher than the first power or a voltage of the second power being higher than a voltage of the first power.

The one or more control circuits (e.g., the information acquisition circuit 730-1~N and control circuit 743 of FIG. 7) may be configured to select the second power as power to be supplied to the charging circuit when information related to the first external electronic device is identified to not satisfy a given second condition and information related to the second external electronic device is identified to satisfy the second condition although the first power satisfies a given first condition.

The information related to the second external electronic device may include information indicative of the type and/or vendor of second external electronic device.

An electronic device according to certain embodiments of the disclosure includes a control circuit configured to manage charging control. Accordingly, when an issue, such as that an overvoltage is input or a plurality of pieces of power is input at the same time through a plurality of connectors, occurs, the elements of the electronic device can be protected against the issue and a battery can be stably charged.

The embodiments of the disclosure disclosed in the specification and drawings only propose specific examples in order to easily describe the contents according to the embodiments of the disclosure and to help understanding of the embodiments of the disclosure, and are not intended to restrict the scope of the embodiments of the disclosure. Accordingly, in the scope of certain embodiments of the disclosure, all changes or modified forms derived based on the technical spirit of certain embodiments of the disclosure in addition to the disclosed embodiments should be construed as being included in the scope of certain embodiments of the disclosure.

What is claimed is:

1. An electronic device, comprising:
   a battery;
   a charging circuit electrically connected to the battery;
   a first connector;
   a second connector;
   a first switch configured to electrically connect the first connector to the charging circuit or to open an electrical connection between the first connector and the charging circuit;
   a second switch configured to electrically connect the second connector to the charging circuit or to open an electrical connection between the second connector and the charging circuit;
   a first control circuit configured to control the first switch to either electrically connect the first connector to the charging circuit or open the electrical connection between the first connector and the charging circuit based on first power supplied by a first external electronic device, and when electrically connecting the first connector to the charging circuit, controlling the second switch to open the electrical connection between the second connector and the charging circuit; and
   a second control circuit configured to at least partially control the second switch to electrically connect the second connector to the charging circuit or electrically open the electrical connection between the second connector and the charging circuit based on second power supplied by a second external electronic device through the second connector, when the first control circuit opens the electrical connection between the first connector and the charging circuit,
   wherein: the first switch is configured to electrically connect the first connector to the charging circuit based on a first connection signal output by the first control circuit and to open the electrical connection between the first connector and the charging circuit based on a first open signal output by the first control circuit, and
   the second switch is configured to electrically connect the second connector to the charging circuit based at least in part on a second connection signal output by the second control circuit and to open the electrical connection between the second connector and the charging circuit based at least in part on a second open signal output by the second control circuit,
   wherein the second switch opens the electrical connection between the second connector and the charging circuit when the first control circuit outputs a first control signal to the second switch although the second control circuit outputs the second connection signal to the second switch.

2. The electronic device of claim 1, wherein:
   the first control circuit is configured to:
   output the first connection signal and the first control signal based on a state of the first power satisfying a given first condition, and
   output the first open signal and a second control signal to connect the second connector to the charging circuit based on the state of the first power not satisfying the given first condition, and
   the second switch is configured to electrically connect the second connector to the charging circuit based on the second connection signal when the second control signal is output.

3. The electronic device of claim 2, wherein the second control circuit is configured to output the second open signal based on the first control signal obtained from the first control circuit.

4. The electronic device of claim 2, further comprising an auxiliary control circuit,
   wherein the auxiliary control circuit is configured to turn on the second switch based on the second connection signal being obtained when the second control signal is obtained and to turn off the second switch based on the first control signal being obtained.

5. The electronic device of claim 2, wherein the first control circuit is configured to output the first connection signal and the first control signal, when the given first condition is satisfied and information obtained from the first external electronic device through the first connector satisfies a given second condition.

6. The electronic device of claim 5, wherein the information obtained from the first external electronic device comprises information indicative of a type or vendor of the first external electronic device.

7. The electronic device of claim 2, wherein the first control circuit is configured to:
   obtain information indicative of a state of the second power from the second control circuit, and
   select the second power as power to be supplied to the charging circuit based at least in part on information indicating the state of the first power and the state of the second power,
   output the first open signal and the second control signal based at least in part on the second power being selected as the power to be supplied to the charging circuit.

8. The electronic device of claim 7, wherein, when the second power is higher than the first power or a voltage of the second power is higher than a voltage of the first power, the first control circuit outputs the first open signal and the second control signal.

9. The electronic device of claim 2, wherein the first control circuit is configured to output the first open signal and the second control signal when the state of the first power satisfies the given first condition, information related to the first external electronic device does not satisfy a given second condition, and information related to the second external electronic device satisfies the given second condition.

10. The electronic device of claim 9, wherein the information related to the second external electronic device comprises information indicative of a type or vendor of the second external electronic device.

11. An electronic device, comprising:
    a battery;
    a charging circuit electrically connected to the battery;
    a first connector;
    a second connector;
    a first switch configured to electrically connect the first connector to the charging circuit or to open an electrical connection between the first connector and the charging circuit;

a second switch configured to electrically connect the second connector to the charging circuit or to open an electrical connection between the second connector and the charging circuit;

a processor electrically connected to the first switch and the second switch and configured to control the first switch and the second switch;

a first control circuit configured to control the first switch to electrically connect the first connector to the charging circuit based on first power supplied by a first external electronic device through the first connector only in substitute for the processor when the processor is an inactive state; and a second control circuit configured to at least partially control the second switch to electrically connect the second connector to the charging circuit based at least in part on second power supplied by a second external electronic device through the second connector only in substitute for the processor when the processor is the inactive state.

12. The electronic device of claim 11, wherein:

the first control circuit is configured to determine whether to output a first connection signal to electrically connect the first connector to the charging circuit by comparing state information of the first power with a given first condition, and the second control circuit is configured to determine whether to output a second connection signal to electrically connect the second connector to the charging circuit at least in part by comparing state information of the second power with a given second condition.

13. The electronic device of claim 12, wherein the given first condition and the given second condition comprise an identical voltage range.

14. An electronic device, comprising:

a battery;
a charging circuit electrically connected to the battery;
a first connector;
a second connector;
one or more switches;
one or more control circuits; and
a processor,
wherein when the processor is an active state, the processor is configured to control the one or more switches to supply one of first power and second power to the charging circuit, when the first power is supplied by a first external electronic device connected through the first connector and the second power is supplied by a second external electronic device connected through the second connector simultaneously; and only when the processor is an inactive state, the one or more control circuits are configured to control the one or more switches to supply at least one of the first power and the second power to the charging circuit, when the first power is supplied through the first connector and the second power is supplied through the second connector simultaneously.

15. The electronic device of claim 14, wherein the one or more control circuits are configured to select one of the first power and the second power as power to be supplied to the charging circuit based on given ranking being differently assigned to the first connector and the second connector.

16. The electronic device of claim 14, wherein the one or more control circuits are configured to select the second power as power to be supplied to the charging circuit by comparing information indicative of a state of the first power with information indicative of a state of the second power.

17. The electronic device of claim 16, wherein the one or more control circuits are configured to select the second power as the power to be supplied to the charging circuit based on the second power being higher than the first power or a voltage of the second power being higher than a voltage of the first power.

18. The electronic device of claim 14, wherein the one or more control circuits are configured to select the second power as power to be supplied to the charging circuit when information related to the first external electronic device is identified satisfy a given first condition, to not satisfy a given second condition, and information related to the second external electronic device is identified to satisfy the given second condition.

19. The electronic device of claim 18, wherein the information related to the second external electronic device comprises information indicative of a type or vendor of the second external electronic device.

* * * * *